United States Patent [19]
Gauthier

[11] Patent Number: 4,472,168
[45] Date of Patent: Sep. 18, 1984

[54] AQUEOUS LITHIUM SALT SOLUTIONS OF FIBER REACTIVE DYESTUFF STABILIZED WITH ARYLAMINO SULFONIC ACID/SALT MIXTURES

[75] Inventor: Donald R. Gauthier, Somerset, Mass.
[73] Assignee: ICI Americas Inc., Wilmington, Del.
[21] Appl. No.: 510,829
[22] Filed: Jul. 5, 1983
[51] Int. Cl.³ .......................................... D06P 67/00
[52] U.S. Cl. ................................... 8/527; 8/549; 8/590; 260/153; 544/189; 544/211; 544/212
[58] Field of Search ..................... 8/549, 527, 590

[56] References Cited
U.S. PATENT DOCUMENTS
3,103,504  9/1963  Horrobin et al. ............... 260/153

Primary Examiner—A. Lionel Clingman
Attorney, Agent, or Firm—Richard A. Rowe

[57] ABSTRACT

Lithium salts of fiber reactive dyestuffs are stabilized in aqueous solution with N,N dialkylamine benzene sulfonic acid salt/acid buffers.

8 Claims, No Drawings

AQUEOUS LITHIUM SALT SOLUTIONS OF FIBER REACTIVE DYESTUFF STABILIZED WITH ARYLAMINO SULFONIC ACID/SALT MIXTURES

This invention relates to improvements in dyestuffs, and in particular to stablized aqueous solutions of lithium salts of dyestuffs having one or more molecular portions having a substituent group which are unstable at a pH outside the range of 4–8. More specifically the invention is directed to aqueous solutions of lithium salts of dyestuff compositions having at least one fiber reactive molecular portion each portion having one hydrolyzable halogen or at least one hydrolyzable sulfate group and in solution therewith a buffering agent selected from a tertiary arylamino sulfonic acid/salt system. The stable aqueous solutions of these fiber reactive dyestuffs are particularly useful in the coloration of cellulosic fibers and present a more desirable form for use in the marketplace. Elimination of worker exposure to the dye in powder form provides for safer handling and bulk storage.

It is known that solid dyestuffs having two hydrolyzable halogen atoms on a triazine ring undergo hydrolysis during their preparation and storage unless stringent precautions are taken to exclude their contact with moisture. Furthermore, it is known that such compounds may be stabilized against decomposition by their admixture with buffering agents. For example, U.S. Pat. No. 3,103,504 teaches the use of arylamino sulfonic acids and their salt mixtures of sodium, potassium, calcium and magnesium to stabilize aqueous and solid compositions containing hydrolyzable dichlorotriazines. Furthermore, U.S. Pat. No. 3,125,564 teaches the use of water soluble alkali metal salts of phosphoric acid as buffering agents for similar compositions. In addition it is also well known that the salts of acid borates can be used as buffering agents to control pH of aqueous solutions and provide stability for solid compositions which undergo decomposition by contact with moisture.

Because of their inherent higher solubility when compared with sodium and potassium the lithium salts of dyestuffs offer a well-known and exploited technique in the dyestuff industry to obtain commercially effective concentrations of liquid dyestuffs in aqueous solution. Dyestuffs linked with a reactive groups having only one halogen or one or more sulfate groups are usually not sufficiently stable for long periods in water as their sodium, potassium, magnesium or calcium salts without a buffer. It has been found that buffering systems comprising phosphates or borates (tetraborates) in the form of their alkali metal salts are ineffective in sufficiently stabilizing aqueous solutions of the lithium salts of reactive dye because of the formation of relatively insoluble lithium phosphates and borates thereby reducing concentration of the buffer. The reduced concentration of the buffer in solution permits a drop in pH below 4 and the accompanying hydrolysis of reactive groups. The rate of hydrolysis accelerates with time and increasing temperature as the pH falls with the acid released by hydrolysis of the reactive group. As this occurs the dye loses effective strength.

It is an object therefore to provide for aqueous solutions of fiber reactive dyestuffs having one or more molecular portions each of which having one hydrolyzable halogen or at least one hydrolyzable sulfate group in the form of lithium salts and which are buffered by an alkali metal or ammonium salt of N,N-dialkylaminobenzenesulfonic acid to provide long term stability against hydrolytic decomposition.

The invention is particularly directed to reactive dyestuffs having a chromophoric molecular portiion containing at least one ionogenic solubilizing group such as a carboxylate, sulfonate or sulfate group as the dye portion of the molecule linked to a fiber reactive portion such as a mono(C-halogen)-1:3:5-triazene ring and other such as illustrated in the following list:

| | Reactive Portion |
|---|---|
| 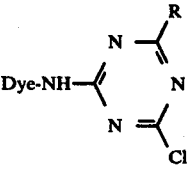 | 4-substituted 2-chloro-s-triazin-6-ylamino (where R = $NH_2$, anilino substituted anilino, substituted naphthylamine, or lower alkoxy but not halogen) |
| Dye-$SO_2CH_2CH_2OSO_3H$ | 2-sulfatoethyl-sulfone, |
| Dye-$NHSO_2CH_2CH_2OSO_3H$ | 2-sulfatoethyl-sulfonamide, |
| 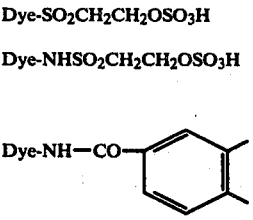 | 2,3-dichloroquinoxaline-6-carbonyl, |
| 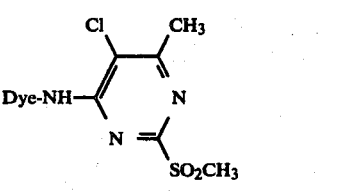 | 5-chloro-6-methyl-2-methyl sulfonyl pyrimidin-4-yl, |
| 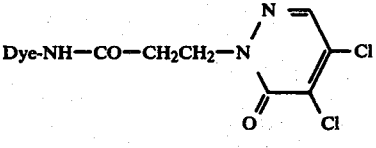 | dichloropyridazonylpropionyl, |
| 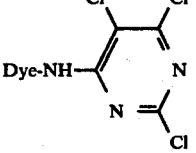 | trichloropyrimidinyl, |
| 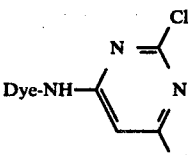 | dichloropyrimidinyl, and |
| 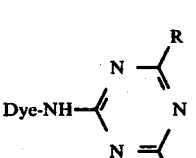 | 4-substituted 2-fluoro-s-triazibylamino (R = $NH_2$, anilino, substituted anilino, substituted naphthylamino, or lower alkoxy but not halogen) |

The dyestuffs may contain one or more of the aforementioned reactive groups as illustrated in the following examples (shown in free acid form):

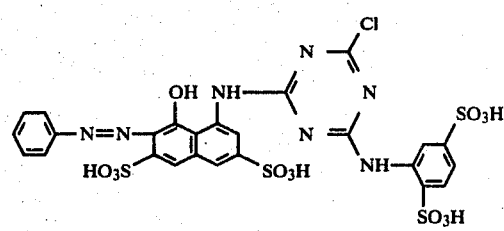

1-hydroxy-2-phenylazo-8-[2-chloro-4-(2,5-disulfoanilino)-S—triazine-6-ylamino]naphthalene-3,6-disulfonic acid

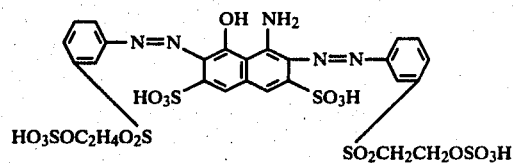

1-amino-8-hydroxy-2,6-bis-[3-(2-sulfatoethylsulfonyl)phenylazo]naphthalene-3,6-disulfonic acid

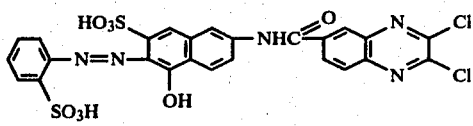

1-hydroxy-2-(2-sulfophenylazo)-6-(2,3-dichloroquinoxaline-6-carbonyl)aminonaphthalene-3-sulfonic acid

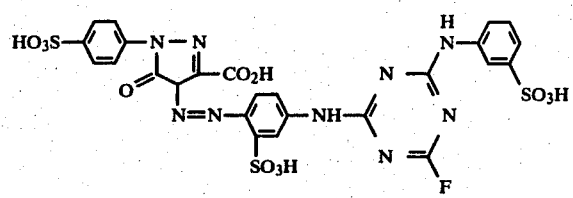

1-(4-sulfophenyl)-3-carboxy-4-(4-[2-fluoro-4-(3-sulfoanilino)-S—triazin-6-ylamino]-2-sulfophenylazo)pyrazol-5-one

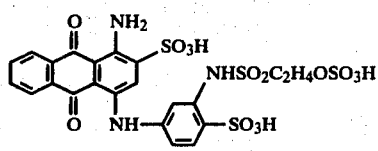

1-amino-2-sulfo-4-[5-(2-sulfatoethylsulfonamide)-4-sulfoanilino]-anthraquinone

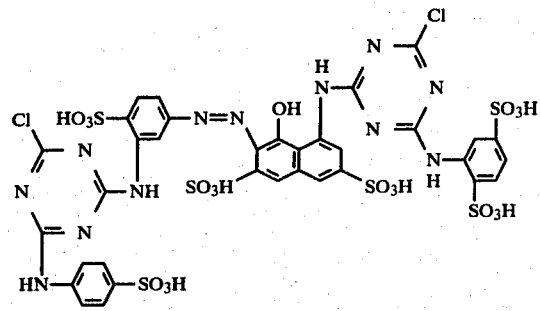

1-hydroxy-2-(5-[2-chloro-4-(4-sulfonanilino)-S—triazinyl-6-ylamino]-2-sulfophenylazo)-8-[2-chloro-4-(2,5-disulfoanilino)-S—triazin-6-ylamino]-naphthalene-3,6-disulfonic acid

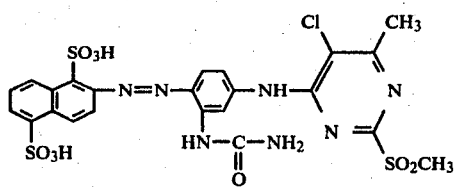

N—(5-chloro-6-methyl-2-methylsulfonylpyrimidin-4-yl)-3-ureido-4-(1,5-disulfo-2-naphthylazo)aniline

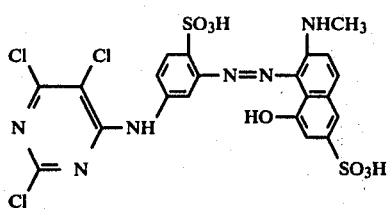

1-hydroxy-7-methylamino-8-[5-(2,5,6-trichloropyrimid-4-ylamino)-2-sulfophenylazo]naphthalene-3-sulfonic acid

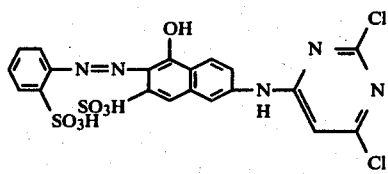

1-hydroxy-2-(a sulfatophenylazo)-6-(2,6-dichloropyrimid-4-ylamino)naphthalene-3-sulfonic acid

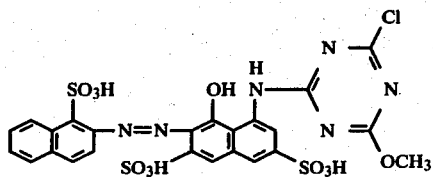

1-hydroxy-2-(1-sulfato-2-naphthylazo)-8-(2-chloro-4-methoxy-5-triazin-6-ylamino)-naphthalene-3,6-disulfonic acid The dyestuffs of the invention are specifically directed to water soluble lithium salts having at least one ionogenic solubilizing group. In addition, at least a portion of additional cations selected from ammonium, alkyl ammonium, alkali metal and alkaline earth metal may be present. It is preferred to have sufficient lithium cation per molecule of dyestuff to give a solubility of at least 5% by weight in water. The lithium content needed will vary with the dyestuff and may work at concentrations as low as 0.25 mol Li per molecule.

The dye portion of the molecule containing the chromophoric group for the dyestuffs include many compounds which are well-known to the dye chemist and may be exemplified by those listed in U.S. Pat. No. 3,125,564. Such dyes comprise but are not limited to azo, anthraquinone, phthalocyanine, triphendioxazine, and formazan chromophoric groups such as illustrated by the following structures.

Examples of chromophoric systems linked to the previously described fiber reactive groups are as follows:

(a) azo derivatives:

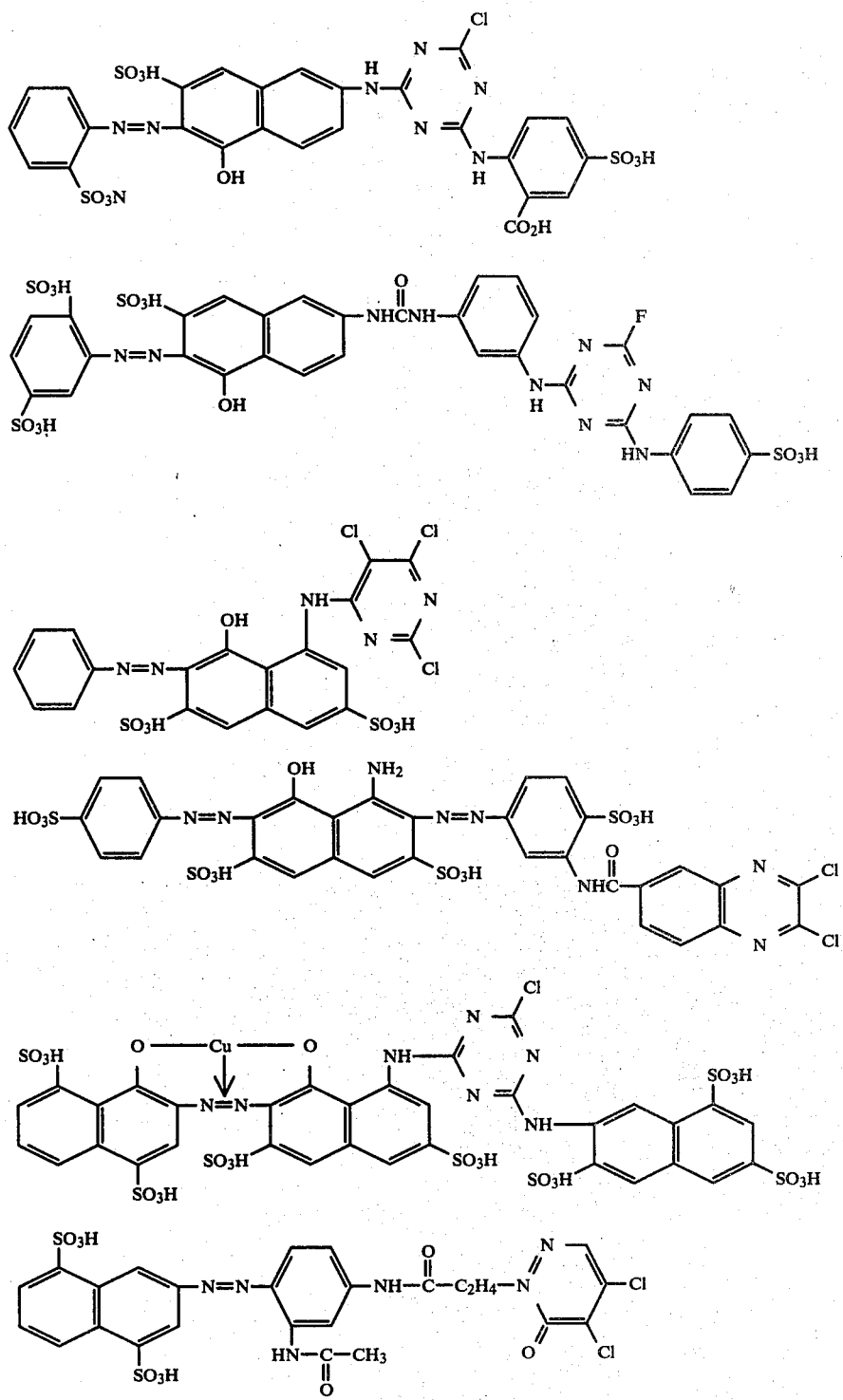
(b) anthraquinone derivatives:
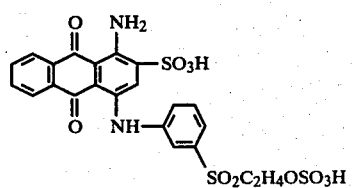
-continued

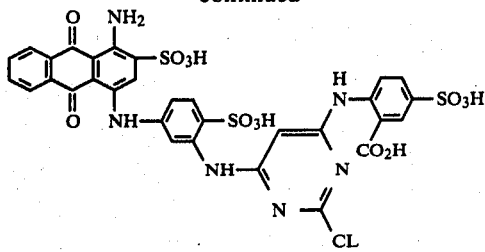
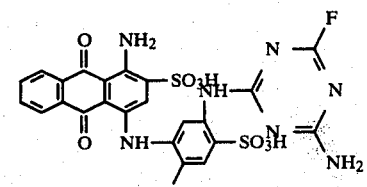
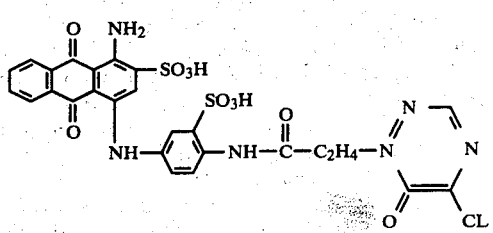

(c) copper phthalocyanine derivatives (CPC):

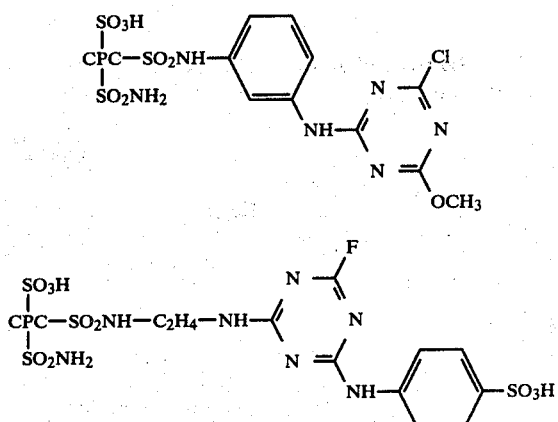

(d) triphendioxazine derivatives:

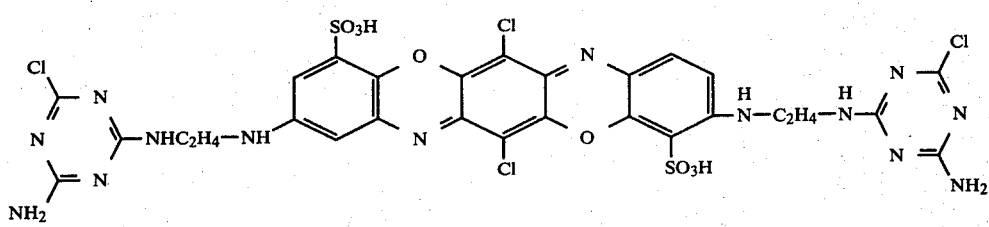

(e) formazan derivatives:

It is contemplated that aqueous solutions of lithium salts of any dyestuff which undergoes decomposition through the hydrolysis of an active halogen group selected from chlorine, bromine or fluorine or other groups such as sulfato such that the dyestuff precipitates from solution may be stabilized by buffering the solution to a pH between 4 and 8 by the presence of from about 0.1–10 percent by weight of the total solution of an N,N-dialkylaminobenzenesulfonate salt as the buffering agent.

The invention is particularly directed to aqueous solutions containing from 5–50% of the above-described dyestuffs buffered between a pH of 4.0–8.0 by the presence of 0.1–10 percent by weight of an N,N-dialkylaminoarylsulfonate of the general formula $R_1R_2N\text{—}Ar\text{—}SO_3X$ wherein $R_1$ and $R_2$ is selected from an alkyl, cycloalkyl, aralkyl group containing at least 2 carbon atoms and X is selected from lithium, sodium, potassium, ammonium or tetraalkyl ammonium or H when in free acid form and AR represents an arylene nucleus wherein the sulfonate is attached to an aromatic ring such as benzene or naphthalene at any position.

The arylaminesulphonic acid used in the buffer mixtures may contain more than one amino group in the above formula. It may contain more than one sulphonic acid group. The sulphonic acid group or groups may be attached to the same aryl nucleus as the amino group, but this is not essential. The sulphonic acid group may, for example, be attached to one of the radicals represented by R in the above formula. Other substituents may be attached to the aryl nucleus, for example chlorine or bromine atoms, alkyl groups for example methyl, and alkoxy groups such as methoxy and ethoxy, nitro groups, carbamyl and sulphamyl groups, carboxylic ester groups, alkyl sulphone and aryl sulphone groups. Substituents may also be present in the phenyl ring of benzyl radicals represented by R in the above formula, whilst alkyl groups represented by R may contain substituents such as hydroxyl, alkoxy or cyano groups. These substituents are expected to have little effect on the ability of the arylamine sulphonic acid to stabilize the lithium dyestuff, provided that the combined effect of such substituents does not cause the arylamine-sulphonic acid to have a pH outside the range 4 to 8.

Suitable arylaminesulphonic acids for use in the compositions of matter include, for example, 4-chloro-N:N-diethylaniline sulphonic acid, N:N-di-n-hexylaniline-m-sulphonic acid, N-ethyl-N-n-hexylaniline disulphonic acid, 2-N:N-diethylaminonaphthalene-6-sulphonic acid, 2-(N-ethyl-N-benzylamino)-toluene-4-sulphonic acid, 2-N:N-diethylaminotoluene-4-sulphonic acid, N-ethyl-N-cyclohexylaniline-sulphonic acid, N-ethyl-N-betahydroxyethylaniline-sulphonic acid, N-ethyl-N-phenylbenzylaminemonosulphonic acid, 2-(N-ethyl-N-phenylamino)-ethanesulphonic acid, 2-(N-butyl-N-phenylamino)ethane sulphonic acid and 4:4'-bis(diethylamino)diphenyl-2:2'-disulphonic acid. Because of their ease of manufacture and efficiency, the preferred arylamine sulphonic acids are the lower N:N-dialkyl-derivatives of metanilic acid and sulphanilic acid especially diethylmethanilic acid, diethylsulphanilic acid, or the mixture of the two obtained by the sulphonation of diethylaniline with oleum.

The arylaminesulphonic acid may be mixed with any metal salt thereof, but preferably there is used the salt of a metal of group I or group II of the periodic classification for example, the calcium or magnesium salt, and above all, the lithium, sodium or potassium salt. A convenient means of forming the mixture comprises grinding together the metal salt, for example the sodium salt, of the arylamine-sulphonic acid and a solid acid, for example sodium bisulphate.

The buffer mixture is added to the aqueous dye salt mixture when formed either before or during the reaction period, or it may be added after the reaction is complete. Where the reaction has been carried out in aqueous suspension or solution, the buffer mixture may be added, either in the solid state or in the form of an aqueous solution. The buffer mixture may conveniently be added as the lithium salt to aqueous dye solution to form the lithium salt complex or as the salt of another metal when the dye salt contains lithium.

It is advantageous, when adding the buffer mixture to an aqueous suspension or solution to make the suspension or solution substantially neutral or slightly acid before addition of the buffer mixture.

Preferably, however, the buffer mixture is added to the product in the form of the aqueous press paste after filtration.

The invention may be better understood by the illustrations offered by but not limited to the following examples wherein all proportions mentioned refer to parts by weight unless otherwise described.

EXAMPLE 1

Into 1,000 parts of an aqueous solution of a dye having the formula:

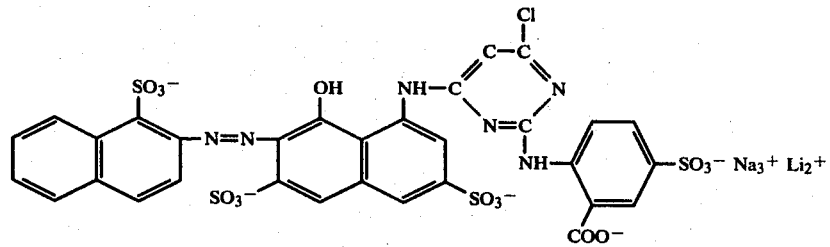

(containing about 16 percent dye as determined by the titanous chloride estimation and 2.0 percent sodium ion and 1.0 percent lithium ion as determined by atomic absorption analysis) were added 85 parts of a 23 percent solution of sodium N,N-diethylanilin-3+4-sulfonate. This liquid had a final pH of 6.5. No precipitation of the dyestuff occurred upon storage at ambient temperature for a period of 6 months at which time the pH was measured at 6.3. The solution suffered no loss in application strength on cellulose fibers.

When an identical solution of the dye containing no buffer was permitted to stand for 3 weeks the pH dropped from 6.5 to 3.5. Significant amounts of product was found to undergo hydrolysis as determined by thin layer chromatography techniques.

EXAMPLE 2

Into 500 parts of an aqueous solution of a dye having the formula:

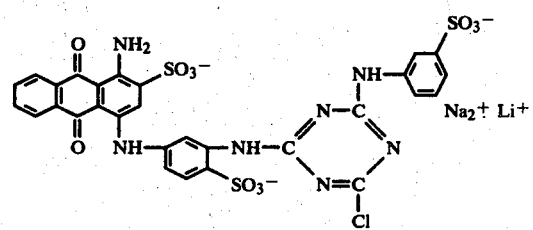

(containing about 15 percent dye as determined by nitrogen analysis and 2.0 percent sodium ion and 1.0 percent lithium ion as determined by atomic absorption analysis) were added 50 parts of a 23 percent solution of sodium N,N-diethylanilin-3+4-sulfonate giving a final pH of 6.2. Upon storing the solution at ambient temperatures for 6 months the pH remained the same, and no evidence of increased hydrolysis as determined by thin layer chromatography was observed. The solution suffered no loss in application strength on cellulosic fiber. Storage of the liquid at 60° C. for a period of two weeks resulted in a drop in application strength of only 10 percent, however, an identical solution containing no buffer almost completely hydrolyzed as determined by thin layer chromatography and underwent a drop in pH of from 6.3 to 1.5. A considerable amount of dye precipitated from solution.

EXAMPLE 3

Into 500 parts of an aqueous solution of a dye having the formula:

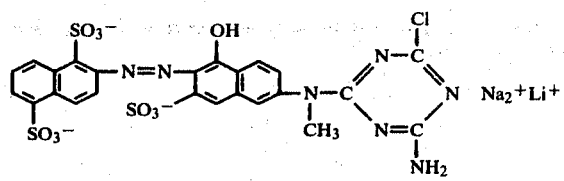

(containing 25 percent dye by titanous estimation and 2 percent sodium ion and 1 percent lithium by atomic absorption analysis) was added 104 parts of water and 63 parts of 26 percent solution of sodium N,N-diethylanilin-3+4-sulfonate. The pH of this solution was 6.3. After storage at ambient temperature of 2 weeks in a sealed jar the pH remained at 6.3. When stored at a temperature of 60° C. for a period to 2 weeks the dye showed no loss in application strength on cellulose fibers and had a pH of 6.3. When stored for 6 months at ambient temperature the dye showed no loss in application strength for cellulose fibers.

When an identical solution containing no sulfonate buffer was stored at 60° C. for a period of 2 weeks a 25 percent loss in application strength on cellulose fibers resulted and the pH of the solution dropped from 6.3 to 3.0. Thin layer chromatography indicated a substantial amount of hydrolized dyestuff.

These examples demonstrate the fact that the buffered solutions of the invention can be stored at ambient temperatures for a considerable length of time as liquids without undergoing substantial decomposition. Furthermore, they indicate that the aqueous solutions may be employed in typical batch and continuous dyeing operations wherein elevated temperatures are experience without suffering substantial loss in dye strength.

What is claimed is:

1. A stable aqueous dyestuff solution comprising a water soluble cationic salt of an organic dyestuff containing at least one chromophoric molecular portion and at least one fiber reactive molecular portion having only one hydrolizable halogen or at least one hydrolizable sulfate group attached thereto, said chromophoric portion having at least one ionogenic sulfate, sulfonate or carboxylate group and 0.1-10 percent by weight of a buffer system consisting of a mixture of the free acid and metal salt of a tertiary arylamino sulfonic acid having the general formula $R_1R_2N-AR-SO_3X$

wherein
$R_1$ and $R_2$ is selected from an alkyl, cycloalkyl, aralkyl group containing at least 2 carbon atoms,
AR is an arylene nucleus selected from benzene or naphthalene,
X is an alkali or alkaline earth metal, an ammonium, or tetraalkyl ammonium cation or hydrogen ion when in the acid form, and at least a 0.25 mol portion of said cation associated with a molecule of said dyestuff or X in said buffer system is a lithium cation such that the concentration of said dyestuff in the solution is at least 5% by weight.

2. A solution of claim 1 having a pH in the range of 4-8.

3. A composition of claim 1 wherein said dyestuff is a mixed salt of lithium and at least one other alkali or alkaline earth metal.

4. A composition of claim 1 wherein said chromophoric molecular portion in said dyestuff are selected from compositions having azo, anthraquinone, phthalocyanine, triphendioxazine and formazan structures.

5. A composition of claim 1 wherein said chromphoric portion is linked with said reactive portion through an amino, sulfone, sulfonimido or carbonimido group.

6. A composition of claim 1 wherein said reactive molecular portion is selected from the group consisting of 4-alkyl, 2-chloro-s-triazine-6-ylamino-, 2-sulfatoethylsulfonyl-, 2-sulfatoethylsulfonamido-, 2,3-dichloroquinoxylene-6-carbonyl-, 5-chloro-6-methyl-2-methylsulfonylpyrimidin-4-yl-, dichloropyridazonyl-propionyl-, trichloropyrimidinyl-, dichloropyrimidinyl-, 4-alkyl-2-fluoro-s-triazine-6-ylaminodifluorochloropyrimidinyl, and 2,4-dichloropyrimidin-5-carbonyl.

7. A composition of claim 1 wherein said reactive molecular portion is linked to said chromophoric molecular portion through an amine group at the 6-position of a 4-substituted 2-chloro-S-triazine ring wherein the substituent at the 4-position is selected from the group consisting of an amino, anilino, substituted anilino, substituted naphthylamino or lower alkoxy but not halogeno.

8. A composition of claim 1 wherein said buffer system is selected from the lithium sodium, potassium, ammonium, and tetraalkylammonium sulfonate salts of N, N diethyl aniline.

* * * * *